(12) United States Patent
Williams et al.

(10) Patent No.: US 12,203,792 B2
(45) Date of Patent: *Jan. 21, 2025

(54) APPARATUS, SYSTEM, AND METHOD OF PROVIDING A SOLIDS LEVEL MONITOR

(71) Applicant: NYPRO INC., Clinton, MA (US)

(72) Inventors: Amanda Williams, St. Petersburg, FL (US); Julio Daniel Oropeza, St. Petersburg, FL (US); Yu-Chang Lee, St. Petersburg, FL (US); Ying Hao Lee, St. Petersburg, FL (US); Martin Johnson, St. Petersburg, FL (US); Marc Theeuwes, St. Petersburg, FL (US); Stefan Vaes, St. Petersburg, FL (US); Toon Diels, St. Petersburg, FL (US)

(73) Assignee: NYPRO INC.

( * ) Notice: Subject to any disclaimer, the term of this patent is extended or adjusted under 35 U.S.C. 154(b) by 0 days.

This patent is subject to a terminal disclaimer.

(21) Appl. No.: 18/540,606

(22) Filed: Dec. 14, 2023

(65) Prior Publication Data

US 2024/0183700 A1      Jun. 6, 2024

Related U.S. Application Data

(63) Continuation of application No. 17/951,994, filed on Sep. 23, 2022, now Pat. No. 11,982,557, which is a
(Continued)

(51) Int. Cl.
*G01F 23/292* (2006.01)
*G01F 15/061* (2022.01)
*G01F 23/18* (2006.01)

(52) U.S. Cl.
CPC ............ *G01F 15/061* (2013.01); *G01F 23/18* (2013.01); *G01F 23/292* (2013.01)

(58) Field of Classification Search
CPC .. G01F 23/284; G01F 23/2845; G01F 23/292; G01F 23/2921; G01F 23/2922;
(Continued)

(56) References Cited

U.S. PATENT DOCUMENTS 1,078,214 A    11/1913  Patnaude
3,553,471 A     1/1971  Maigret
(Continued)

FOREIGN PATENT DOCUMENTS

CN    1121700    5/1996
CN    1259090    7/2000
(Continued)

OTHER PUBLICATIONS

Chinese Office Action issued in App. No. CN20198037470, dated Oct. 11, 2023, 9 pages.
(Continued)

*Primary Examiner* — Herbert K Roberts
(74) *Attorney, Agent, or Firm* — Riverside Law LLP

(57) ABSTRACT

An apparatus, system and method for providing a consumable level monitor for association with a solid content-filled consumable. The embodiments may include a sensing module embedded in a label associated with the consumable suitable to sense the consumable level; and a visual indicator suitable to receive the consumable level from the sensing module, and for communicating the consumable level to a user.

12 Claims, 8 Drawing Sheets

Related U.S. Application Data continuation of application No. 17/052,779, filed as application No. PCT/US2019/030658 on May 3, 2019, now abandoned.

(60) Provisional application No. 62/666,605, filed on May 3, 2018.

(58) Field of Classification Search
CPC ............ G01F 23/2924; G01F 23/2925; G01F 23/2927
See application file for complete search history.

(56) References Cited

U.S. PATENT DOCUMENTS

| | | | |
|---|---|---|---|
| 4,874,023 A | 10/1989 | Ulm | |
| 4,991,635 A | 2/1991 | Ulm | |
| 5,005,407 A | 4/1991 | Koon | |
| 5,213,597 A | 5/1993 | Campbell | |
| 5,277,337 A | 1/1994 | Ford | |
| 5,368,197 A | 11/1994 | Sutera | |
| 5,383,574 A | 1/1995 | Raphael | |
| 5,544,770 A | 8/1996 | Travisano | |
| 5,636,762 A | 6/1997 | Juhola | |
| 5,641,006 A | 6/1997 | Autrey | |
| 6,095,370 A | 8/2000 | Rhine | |
| 6,554,382 B1 | 4/2003 | Sleger | |
| 6,741,180 B2 | 5/2004 | Lassota | |
| 6,820,772 B1 | 11/2004 | Bennett, Jr. | |
| 7,000,468 B2 | 2/2006 | Doorhy | |
| 7,107,838 B2 | 9/2006 | Chai | |
| 7,258,005 B2 | 8/2007 | Nyce | |
| 7,331,487 B2 | 2/2008 | Macler, II | |
| 7,401,513 B2 | 7/2008 | Szela | |
| 7,506,576 B1 | 3/2009 | Lassota | |
| 7,562,571 B2 | 7/2009 | Raffalt | |
| 7,654,421 B2 | 2/2010 | Chan | |
| 7,661,307 B1 | 2/2010 | Milone | |
| 7,712,364 B2 | 5/2010 | Radhakrishnan | |
| 7,798,373 B1 | 9/2010 | Wroblewski | |
| 8,014,789 B2 | 9/2011 | Breed | |
| 8,159,660 B2 | 4/2012 | Mimeault | |
| 8,177,096 B2 | 5/2012 | Macler | |
| 8,382,913 B2 | 2/2013 | Classen | |
| 8,387,455 B1 | 3/2013 | Kaminski | |
| 8,429,965 B2 | 4/2013 | Radhakrishnan | |
| 8,464,584 B2 | 6/2013 | Lassota | |
| 8,464,906 B2 | 6/2013 | Macler | |
| 8,469,050 B2 | 6/2013 | King | |
| 8,931,340 B2 | 1/2015 | Wiederkind-Klein | |
| 8,966,973 B1 | 3/2015 | Milone | |
| 8,980,014 B2 | 3/2015 | Classen | |
| 9,052,227 B1 | 6/2015 | Lassota | |
| 9,138,091 B2 | 9/2015 | Zhao | |
| 9,153,119 B2 | 10/2015 | Stapleford | |
| 9,212,042 B2 | 12/2015 | Veltrop | |
| 9,261,395 B2 | 2/2016 | Shearer | |
| 9,311,806 B2 | 4/2016 | Hazen | |
| 9,417,635 B2 | 8/2016 | Hampton | |
| 9,459,132 B2 | 10/2016 | Fehrenbach | |
| 9,476,752 B2 | 10/2016 | Vilag | |
| 9,488,513 B2 | 11/2016 | Kumar | |
| 9,510,727 B2 | 12/2016 | Classen | |
| 9,610,001 B2 | 4/2017 | Classen | |
| 9,658,095 B2 | 5/2017 | Winkens | |
| 9,911,306 B2 | 3/2018 | Tshilombo | |
| 9,952,082 B2 | 4/2018 | Schwartz | |
| 10,114,139 B1 | 10/2018 | Mirisharif | |
| 11,280,042 B2 | 3/2022 | Williams | |
| 2002/0020449 A1 | 2/2002 | Imai | |
| 2002/0145527 A1 | 10/2002 | Lassota | |
| 2002/0161652 A1 | 10/2002 | Paullin | |
| 2004/0199131 A1 | 10/2004 | Kitamura | |
| 2005/0067434 A1 | 3/2005 | Yu | |
| 2005/0162277 A1 | 7/2005 | Teplitxky | |
| 2005/0172712 A1 | 8/2005 | Nyce | |
| 2006/0006353 A1* | 1/2006 | Wirthlin | G01F 23/2922 250/573 |
| 2006/0033630 A1 | 2/2006 | Lyall, III | |
| 2008/0036615 A1 | 2/2008 | Lyall, III | |
| 2008/0277414 A1 | 11/2008 | Macler | |
| 2008/0292446 A1 | 11/2008 | Caldwell | |
| 2009/0031798 A1 | 2/2009 | Radhakrishnan | |
| 2009/0158841 A1 | 6/2009 | Winkens | |
| 2009/0187357 A1 | 7/2009 | Ho | |
| 2009/0212069 A1 | 8/2009 | Lassota | |
| 2009/0294469 A1 | 12/2009 | Poulain | |
| 2010/0209313 A1 | 8/2010 | Davis | |
| 2011/0166699 A1 | 7/2011 | Palmquist | |
| 2011/0265562 A1 | 11/2011 | Li | |
| 2011/0314907 A1 | 12/2011 | Wiedekind-Klein | |
| 2012/0067920 A1 | 3/2012 | Veltrop | |
| 2012/0138824 A1* | 6/2012 | Wen | G01F 23/2927 250/575 |
| 2012/0193373 A1 | 8/2012 | Macler | |
| 2012/0218106 A1 | 8/2012 | Zaima | |
| 2012/0305605 A1 | 12/2012 | Vassaux | |
| 2013/0036815 A1 | 2/2013 | Bernhardsgruetter | |
| 2013/0206011 A1 | 8/2013 | Ozanne | |
| 2013/0269832 A1 | 10/2013 | Gengerke | |
| 2013/0276533 A1 | 10/2013 | Wilder | |
| 2013/0285681 A1 | 10/2013 | Wilson | |
| 2013/0334214 A1 | 12/2013 | Yogev | |
| 2013/0344206 A1 | 12/2013 | Yoakim | |
| 2014/0014684 A1 | 1/2014 | Classen | |
| 2014/0037413 A1 | 2/2014 | Takashima | |
| 2014/0152323 A1 | 6/2014 | Kumar | |
| 2014/0354438 A1 | 12/2014 | Hazen | |
| 2015/0021360 A1 | 1/2015 | Veltrop | |
| 2015/0090625 A1 | 4/2015 | Bauss | |
| 2015/0122015 A1 | 5/2015 | Leppard | |
| 2015/0129039 A1 | 5/2015 | Mulvaney | |
| 2015/0329347 A1 | 11/2015 | Veldhi | |
| 2015/0366411 A1 | 12/2015 | Yang | |
| 2016/0003615 A1 | 1/2016 | Biswas | |
| 2016/0007798 A1 | 1/2016 | Jimenez | |
| 2016/0047683 A1 | 2/2016 | Winkens | |
| 2016/0146659 A1 | 5/2016 | Saltzgiver | |
| 2016/0230625 A1 | 8/2016 | Bradford | |
| 2016/0257554 A1 | 9/2016 | Manwani | |
| 2016/0286993 A1 | 10/2016 | Pau | |
| 2017/0062263 A1 | 3/2017 | Kesil | |
| 2017/0135530 A1 | 5/2017 | Macleod | |
| 2017/0161676 A1 | 6/2017 | Aji | |
| 2017/0228519 A1 | 8/2017 | Chu | |
| 2017/0278059 A1 | 9/2017 | Aji | |
| 2017/0299416 A1 | 10/2017 | Rondano | |
| 2017/0299417 A1 | 10/2017 | Otagaki | |
| 2017/0328761 A1 | 11/2017 | Schwartz | |
| 2018/0080807 A1 | 3/2018 | Singh | |
| 2018/0099850 A1 | 4/2018 | Lyons | |
| 2018/0100754 A1 | 4/2018 | Kumar | |
| 2018/0111145 A1 | 4/2018 | Ophardt | |
| 2018/0132643 A1 | 5/2018 | Shklar | |
| 2018/0228977 A1 | 8/2018 | Schabbach | |
| 2018/0266866 A1 | 9/2018 | Biswas | |
| 2018/0266873 A1 | 9/2018 | Goodier | |
| 2018/0303271 A1 | 10/2018 | Glucksman | |
| 2018/0321072 A1 | 11/2018 | Williams | |
| 2018/0326661 A1 | 11/2018 | Johnson | |
| 2018/0344070 A1 | 12/2018 | Perrelli | |
| 2019/0021529 A1 | 1/2019 | Schucker | |
| 2019/0125524 A1 | 5/2019 | Huehn | |

FOREIGN PATENT DOCUMENTS

| | | |
|---|---|---|
| CN | 1452107 | 10/2003 |
| CN | 1508738 | 6/2004 |
| CN | 1784354 | 6/2006 |
| CN | 101573063 | 11/2009 |
| CN | 202126296 U | 1/2012 |
| CN | 102421697 | 4/2012 |
| CN | 202915989 U | 5/2013 |
| CN | 103251310 | 8/2013 |

(56) References Cited

FOREIGN PATENT DOCUMENTS

| | | |
|---|---|---|
| CN | 105203185 | 12/2015 |
| CN | 105813519 | 7/2016 |
| CN | 105939643 | 9/2016 |
| CN | 106017637 | 10/2016 |
| CN | 205642549 | 10/2016 |
| CN | 206252346 U | 6/2017 |
| CN | 107040260 | 8/2017 |
| CN | 107634885 | 1/2018 |
| CN | 107689338 A | 2/2018 |
| DE | 102012200949 | 7/2013 |
| EP | 1270501 A1 | 1/2003 |
| EP | 2180299 A1 | 4/2010 |
| EP | 2282184 A1 | 2/2011 |
| EP | 3244175 | 11/2017 |
| EP | 3263000 A1 | 1/2018 |
| GB | 2059596 A | 4/1981 |
| GB | 2099791 | 11/1984 |
| GB | 0200167 | 2/2002 |
| GB | 2383845 A | 7/2003 |
| HK | 1211782 | 5/2016 |
| JP | H09174039 | 7/1997 |
| JP | 2002039838 | 2/2002 |
| JP | 2012101796 | 5/2012 |
| KR | 20010082146 | 8/2001 |
| KR | 20100009743 A | 1/2010 |
| KR | 20120050987 | 5/2012 |
| KR | 20120127792 | 11/2012 |
| WO | 9965818 | 12/1999 |
| WO | 2005092012 | 10/2005 |
| WO | 2006044782 | 4/2006 |
| WO | 2011127334 | 10/2011 |
| WO | 2014096405 | 6/2014 |
| WO | 2018204720 | 11/2018 |

OTHER PUBLICATIONS

Chinese Office Action issued in App. No. CN20198037889, dated Oct. 10, 2023, 8 pages.
Chinese Office Action issued in App. No. CN202210122381, dated Sep. 23, 2023, 4 pages.
EPO Communication pursuant to Article 94(3) issued in App. No. EP19796780, datd Dec. 13, 2023, 5 pages.
International Preliminary Report on Patentability, dated Nov. 5, 2019 for PCT/US2018/030987. 10 pages.
International Search Report and Written Opinion dated Aug. 27, 2018 in PCT/US2018/030987. 12 pages.
Office Action (Non-Final Rejection) dated Sep. 20, 2023 for U.S. Appl. No. 17/952,010 (pp. 1-15).
Office Action (Notice of Allowance and Fees Due (PTOL-85)) dated Jan. 11, 2024 for U.S. Appl. No. 17/952,010 (pp. 1-10).
Office Action (Notice of Allowance and Fees Due (PTOL-85)) dated Jan. 16, 2024 for U.S. Appl. No. 17/951,994 (pp. 1-6).
Parashar, Mohita et al., "Water Level Monitoring System in Water Dispensers using IoT", IRJET, (20180400), vol. 05, ISSN 2395-0056, pp. 1217-1220, XP055756965.
Chinese Office Action (including English translation) issued in App. No. CN202080096920, dated Dec. 4, 2023, 16 pages.
Chinese Office Action (including English translation) issued in App. No. CN202080096920, dated Jul. 26, 2024, 16 pages.

* cited by examiner

APPARATUS, SYSTEM, AND METHOD OF PROVIDING A SOLIDS LEVEL MONITOR

CROSS-REFERENCE TO RELATED APPLICATION

This application is a continuation application of U.S. application Ser. No. 17/951,994 filed Sep. 23, 2022 which is a continuation application of U.S. application Ser. No. 17/052,779 filed Nov. 3, 2020 which is a national phase application claiming the benefit of priority to International Application No. PCT/US2019/030658, filed May 3, 2019, entitled APPARATUS, SYSTEM, AND METHOD OF PROVIDING A SOLIDS LEVEL MONITOR, which claims the benefit of priority to U.S. Provisional Application No. 62/666,605, filed May 3, 2018, entitled APPARATUS, SYSTEM, AND METHOD OF PROVIDING A SOLIDS LEVEL MONITOR, each of which is incorporated herein by reference as if set forth in its entirety.

BACKGROUND

Field of the Disclosure

The disclosure relates generally to sensing, and, more particularly, to an apparatus, system, and method of monitoring solids levels in a container and indicating a need for replenishment.

Background of the Disclosure

It is well understood that various types of solids may be carried within containers, and may be dispensed over extended time periods in discreet quantities from such containers, such as in servings or doses. In general, the solids placed ultimately placed within the container may be tracked, in bulk, prior to delivery to or purchase by the ultimate consumer. For example, bulk tracking may be performed on farmed goods as they are farmed, and as they are shipped for distribution; warehoused solids may be tracked by production date, such as by UPC code or the like, and/or such as by warehoused pallet, and so on; once the goods reach a sales center, such as a grocery store, they may be tracked, such as by UPC code or the like, from an inventory perspective; but, once the solids reach the consumer and are placed into a container, such as for consumption, or consumed from a purchased container, there are no longer readily available tracking methodologies at present.

Thus, in embodiments such as the aforementioned, it is often the case that the only way for a user/consumer to monitor how much remains in the container is to periodically shake, lift, or otherwise manipulate the container to allow for a qualified guess by the user as to how much remains therein. Further, there is historically no methodology whereby proper dosing for use of the solid in a container may be readily assessed. Yet further, there is presently no mechanism whereby a seller of a solid can assess a consumer's need for additional solids.

Therefore, the need exists for an apparatus, system, and method of monitoring solid levels within a container, of dosing a solid within a container, and of automatically indicating (herein referred to as "autoreplenishment"), such as to at least one of a consumer and a seller, when the need for additional solid and/or a container thereof occurs.

SUMMARY

The embodiments are and include at least an apparatus, system and method for providing a consumable level monitor for association with a solid content-filled consumable. The embodiments may include a sensing module embedded in a label associated with the consumable suitable to sense the consumable level; and a visual indicator suitable to receive the consumable level from the sensing module, and for communicating the consumable level to a user.

BRIEF DESCRIPTION OF THE DRAWINGS

The disclosure is illustrated by way of example and not limitation in the accompanying drawings, in which like references indicate similar elements, and in which.

DETAILED DESCRIPTION

Figure 1:
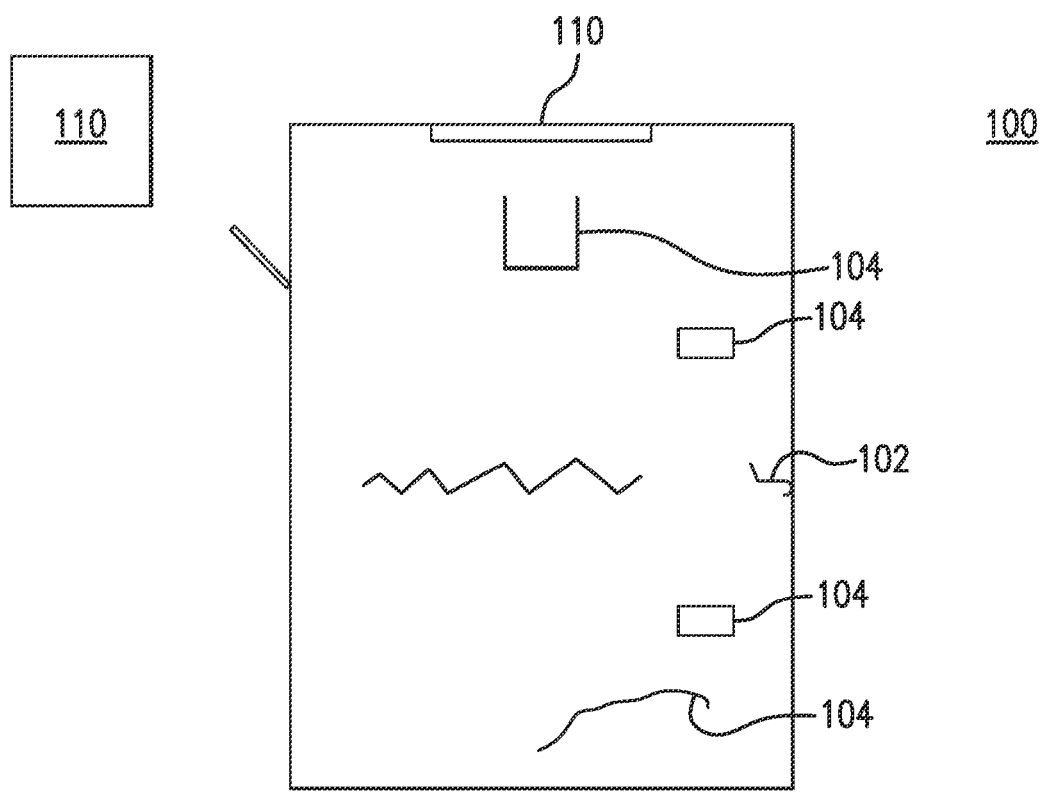
FIG. 1 illustrates an exemplary container that includes a solids sensing system.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Processor-implemented modules, systems and methods of use are disclosed herein that may provide networked access to a plurality of types of digital content, including but not limited to video, image, text, audio, metadata, algorithms, interactive and document content, and which track, deliver, manipulate, transform and report the accessed content. Described embodiments of these modules, systems and methods are intended to be exemplary and not limiting. As such, it is contemplated that the herein described systems and methods may be adapted and may be extended to provide enhancements and/or additions to the exemplary modules, systems and methods described. The disclosure is thus intended to include all such extensions.

Furthermore, it will be understood that the term "module" as used herein does not limit the functionality to particular physical modules, but may include any number of tangibly-embodied software and/or hardware components having a transformative effect on at least a portion of a system. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (which may work in connection with an operating system) to implement one or more functions and methods as described below. In this regard, the program code may be implemented in any desired language, and may be implemented as machine code, assembly code, byte code, interpretable source code or the like (e.g., via C, C++, C #, Java, Actionscript, Objective-C, Javascript, CSS, XML, etc.).

Embodiments may include a solids level monitoring apparatus, system, and method, as well as an auto replenishment apparatus, system, and method for solids typically within a container, for which monitoring of the level of those solids has not historically occurred. The embodiments may include a stand-alone base that is distinct from the one or more containers, and which may include one or more printed circuit boards, firmware, network communication capabilities, user interfaces and indicators, provided power, and/or a dispenser for dispensing solids from a container associated with the base. The embodiments of the base may be associated with one or more types of containers, such as may be formed of plastic, cardboard, or glass, and may extend upward into contact, in part or in whole, with one or more aspects of the container placed into the base, such that the container is brought into contact with aspects of the base in order that the functionality discussed herein may be provided. Of note, the container may have associated there with one or more aspects, such as electronic labels, to provide the functionality herein, either discretely or in conjunction with the encompassing and electronic aspects of the base, as described throughout.

Further, included in the embodiments may be: cloud based storage and communication with one or more of the bases; one or more smartphone apps for communication with the one or more bases and/or the cloud based communication site; and an analytics dashboard, which may be app and/or web-based, such as may be used by a consumer or seller of the solids. As used herein, a "solids level" monitored in the disclosed apparatuses, systems and methods is indicative of the amount of solids consumed from or remaining in a container associated with aspects of the embodiments; a "dose" is an amount of solid dispensed for a given purpose, such as to be eaten or for medicinal purposes; and an "auto replenishment" is that which may occur when the level in a container reaches a point at which a reorder is required.

In accordance with the foregoing, the embodiments provide the tracking of solids upon use of the solids from a container. This tracking may allow for reordering of the solids in a container, tracking of individual doses of the solids upon use, tracking of the unused portions of a solid after dosing, and/or bulk tracking of the solids, by way of non-limiting example.

As illustrated in FIG. 1, tracking of the solids may be performed while the solids reside in a container. The container may be a container 100 in which the solids 102 were purchased in the example of FIG. 1, although other containers may be employed as discussed throughout. The container may include one or more active or passive capabilities for sensing 104 of the contents of the container, and/or sensing of doses dispensed from the container. By way of non-limiting example, the container may be a cereal box and hence the contents may be cereal, and additionally the active or passive sensing aspect may be one or more smart labels placed upon the cereal box.

The sensing employed herein may be any one or more types of sensing suitable for sensing the contents of the box or doses dispensed from the box. By way of example, the sensing may be one or more photo conductive material sensors, which may be printed around at least a portion of the label of the container. Thereby, as portions of the label are uncovered, i.e., as the amount of solids within the container decreases, the photo conductive material senses the additional light that now hits the photo conductive label sensor. Thereby, the level of solids is sensed as indicated by the light received by the photo conductive label.

Of course, a variety of other sensing methodologies may be employed, such as, but not limited to, infrared, ultrasound, proximity sensing, other types of light sensing, derivative sensing, weight sensing, sound sensing, or resistance/conductance sensing, by way of non-limiting example. Needless to say, one or more of the foregoing sensing methodologies may vary in the uniformity of the sensing output, such as in accordance with the type of bulk solid 102 item placed within the container. Therefore, adjustments may be necessary in the type of sensing used, and/or in the processing of the sensor output, in order to properly sense different types of bulk items.

In accordance with the foregoing, the sensor output may be active or passive, as discussed. In either case, the output of the sensor must be provided to a processing system 110. This may be done by any of a variety of methods. For example, a highly simplistic processor may be included on the container in association with the sensor. In such cases, the processor may include some wireless communication capabilities, such as RF, infrared, blue tooth, Wi-Fi, or the like, or communication with the processing chip may occur based on an active external interrogation of the processing chip. Alternatively, the one or more processors may be off-container, and hence may form part of a system that actively interrogates the container to obtain the requisite sensing output, as is also discussed further hereinbelow with respect to FIG. 2.

Figure 2:
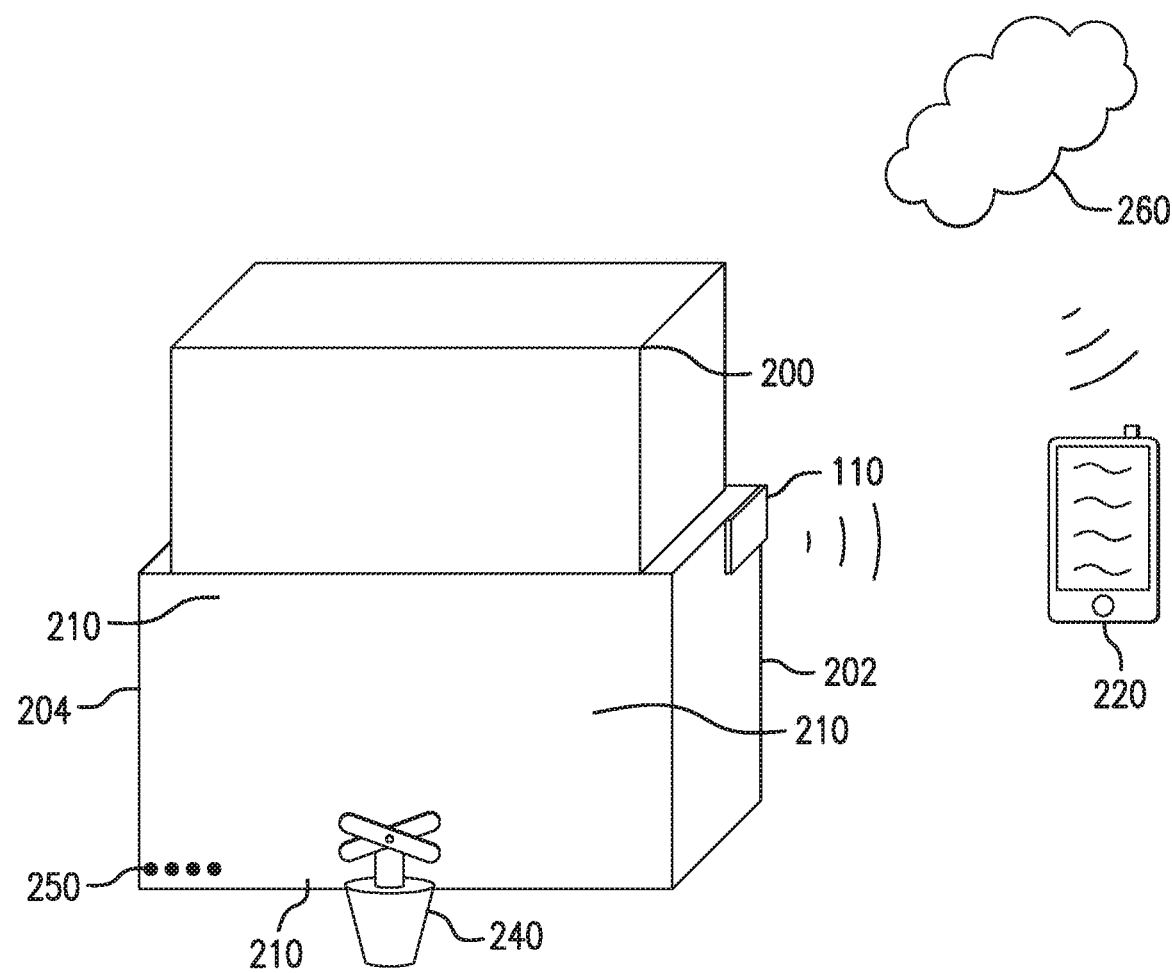
FIG. 2 illustrates an exemplary dispensing base and solids container in a solids sensing system.

FIG. 2 illustrates an embodiment in which either a container 200 is placed into a dispensing base unit 202, or the bulk solids 204 to be sensed are dispensed into a container physically associated with a dispensing unit. As such, the cereal dispensing unit may include a container, or may encompass a container placed therein, in whole or in part.

In the embodiment of FIG. 2, and as discussed above with respect to FIG. 1, the sensing capabilities 210 may be provided on a container placed into the dispensing unit. Additionally and alternatively, the sensing may be provided in association with the container of the dispensing unit, or in association with the dispensing unit itself, such as wherein the sides of the dispensing unit rise a substantial amount up to encompass a container placed therein and allow association of sensing capabilities placed within the dispensing unit with a container placed therein. Likewise, the processing discussed above with respect to FIG. 1 and/or the external communications discussed above with respect to FIG. 1 may be provided in the dispenser unit of FIG. 2. As is the case with the embodiments of FIGS. 1 and 2, after processing the sensed information may be wired or wirelessly communicated to one or more information processing systems, such as telephonic or desktop applications, suitable to convey information regarding the need to replenish or the state of dispensing of the solids associated with the container. This communication may occur directly with a proximate device 220, or may occur remotely, such as via the internet, cloud communications, the cellular network, or the like.

As referenced with respect to FIG. 1, the type of sensing used, and/or the propriety of the use of different types of sensing, may vary with the uniformity of the bulk solids within a container. Needless to say, the foregoing may also vary with the size and shape of a container, such as the size of the container placed into a dispenser, and they also vary as to the most suitable location for sensing. By way of non-limiting example, the dispenser in the embodiment of FIG. 2 may include the most suitable sensing location within the dose dispenser associated with the dispensing unit. Similarly, in the embodiment of FIG. 2, different types of sensing may be used or otherwise activated by the dispenser and/or the processor associated with the dispenser, such as based on the characteristics of the container or bulk solid placed within the dispensing unit.

The dispensing base may include a dispenser 240, such as a crank, spout with spigot, or the like, for the dispensing of the solids from the container received into the base. The dispenser base and the dispenser may be, by way of non-limiting example, plastic in composition, and/or may be substantially injection molded, such as with one or more actuation elements, such as a handle, switch, button, or the like.

The base may include one or more indicator LEDs 250 to indicate dosage and auto replenishment; one or more network communication capable modules, such as for communicating with a smart phone, local area network, cellular network, or the like; one or more power modules to provide power to the base modules, and which may include batteries that may be permanent/semipermanent (i.e., rechargeable) or replaceable; and or other optional elements, such as one or more audio alarms to support or replace the LED indicators of correct dosage or auto replenishment.

Further included may be firmware and software to provide the functionality discussed throughout. For example, firmware may sense the solids level based on the intercommunication of the sensing and the processing, and may use this information to indicate dosing or auto replenishment. Likewise, dosing, and/or auto replenishment, may be information provided remotely from cloud-based algorithms, such as to the firmware of the base.

As referenced, the disclosed communication capabilities may include communication with one or more smartphone apps 220 having user information associated therewith, and which may receive user feedback regarding levels, dosing, auto replenishments, and so on. Such a smart phone app may communicate with the base via, for example, WiFi, Bluetooth, BLE, or cellular communication methodologies, and further, the firmware of the base may be suitable to batch information and data and/or otherwise piggyback to a smart phone having resident thereon the referenced app.

Further, a cloud-based backend 260 may store and serve received data to and from the aforementioned app, and to or from one or more web-based or app-based dashboards. Some or all of the additional processing discussed throughout may be performed at the cloud based backend, such as alerts or email confirmations in the circumstances of auto replenishment, such as instead of drawing on the limited resources of the dispensing base's firmware or processors.

As used herein, the disclosed system may include two aspects, as discussed throughout. More particularly, the first aspect may be a "consumable", such as the food container discussed above with respect to FIGS. 1 and 2, which may include a disposable good comprised of a package which includes therein a solid or liquid for consumption by user. The consumable may be rigid or flexible, and may be or include, by way of non-limiting example, a bottle, cartridge, bag, jar, such as with a closure, a disposable dispenser, a box, such as may be formed of cardboard, or the like.

Also included within the system may be a durable aspect such as the aforementioned dispensing unit 240, by way of example, such as may be physically and/or communicatively associated with a consumable. The durable may, as referenced above, also include communication capabilities to back-end 260, as discussed above. Unlike the consumable, the durable aspect may have a usable life that spans the exhaustion of a plurality of consumables, such as over a predetermined time period, such as over the course of a month, a year, or the like.

As discussed throughout, the automatic reordering envisioned herein may reflect a need to reorder not only a consumable, but additionally a durable aspect of the disclosed system. By way of non-limiting example, durable and consumable pairs may include: razors and razor blades; a soap dispenser and a soap or shampoo bottle; a hand soap dispenser and a refill soap bag; a cereal box and a turning crank cereal dispenser; a printer and an ink cartridge; a disposable detergent bottle and an ergonomic spicket dispenser; a spice rack and a spice bottle; a centrifuge and a vial of bodily fluid; and a coffee machine and coffee, tea, or other beverage pods.

In prior efforts, the smart label of a consumable has been read by a durable with which the consumable is paired solely in order to identify the consumable. That is, a consumable may typically be associated with and RFID or NFC Tag, a Q.R. code, a barcode, a UPC code, or the like, which, when read by a paired durable, serves merely to identify the consumable. In contrast, the proposed embodiments may, embed semi-smart and smart labels on or in the consumables such that a wealth of information beyond identification may be sensed or otherwise conveyed to and by the paired durable, such as exclusively and only upon pairing of the consumable with the durable. That is, the durable may include a plurality of conventional electronics designed to sense/read the detailed consumable information provided by the semi-smart label of the consumable. Accordingly, the disclosed embodiments may provide functionality beyond mere identification, and may provide significant cost advantages over RFID, NFC, or optical reading methods previously provided for the consumable and durable pair.

Such functionality may be provided, such as only upon pairing of the consumable with the durable, by any of a variety of methods that will be understood to the skilled artisan in light of the discussion herein. For example, discussed throughout are capacitive proximity sensing, light sensing (such as using photo resistive sensors), and conductivity or resistivity sensing (wherein electrically unconnected portions of the system are subsequently connected to indicate a content level) to provide content identification for consumable items.

Figure 3A:
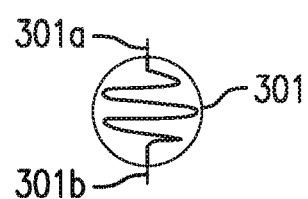
FIG. 3 illustrates aspects of the embodiments.
Figure 3B:
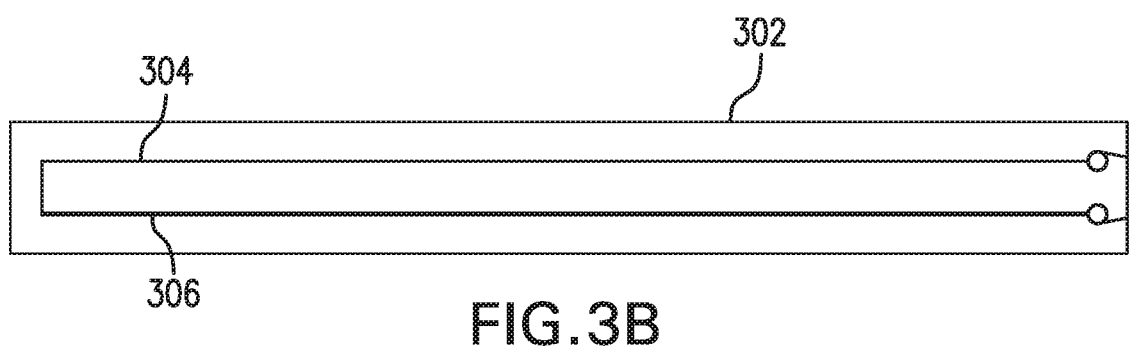

By way of non-limiting example, FIG. 3A illustrates the use of photo resistance to provide content sensing. In the embodiment illustrated, a photo resistive element 301 for use on a photoresistive label, such as that illustrated in FIG. 3B, is comprised of an anode and cathode connective points 301a, 302b. A photoresistive label 302 may include effective photoresistive elements 301 to provide a sensing circuit, such as may be formed of a conductive trace 304 communicatively associated with a photo resistive trace 306. As will be understood, conductive trace 304 may be silver based, and the photo resistive trace may be a printed zinc oxide based ink, by way of non-limiting example. The anode and cathode provided by the connectively associated traces provide a sensing circuit 308 which, upon variations in the level of product that blocks the photo resistive trace 306, indicates a level of the contents associated with the photo resistive label 302.

Figure 4A:
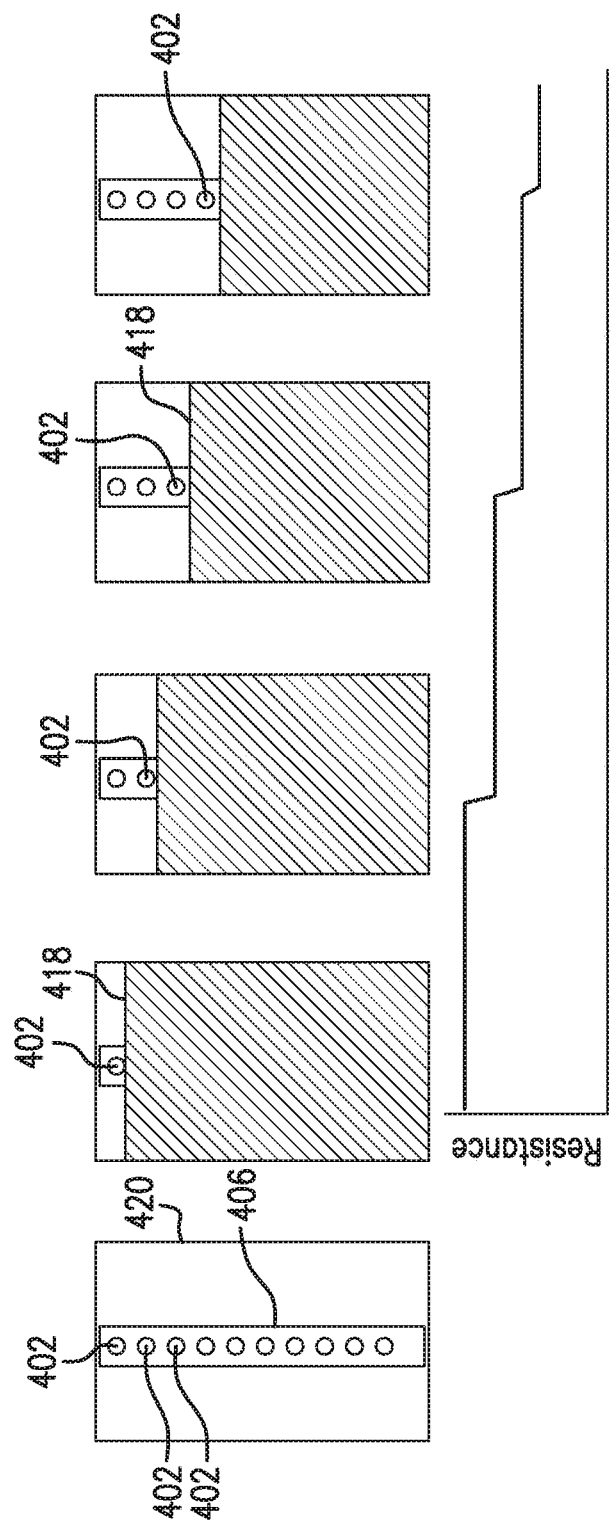
FIG. 4 illustrates aspects of the embodiments.
Figure 4B:
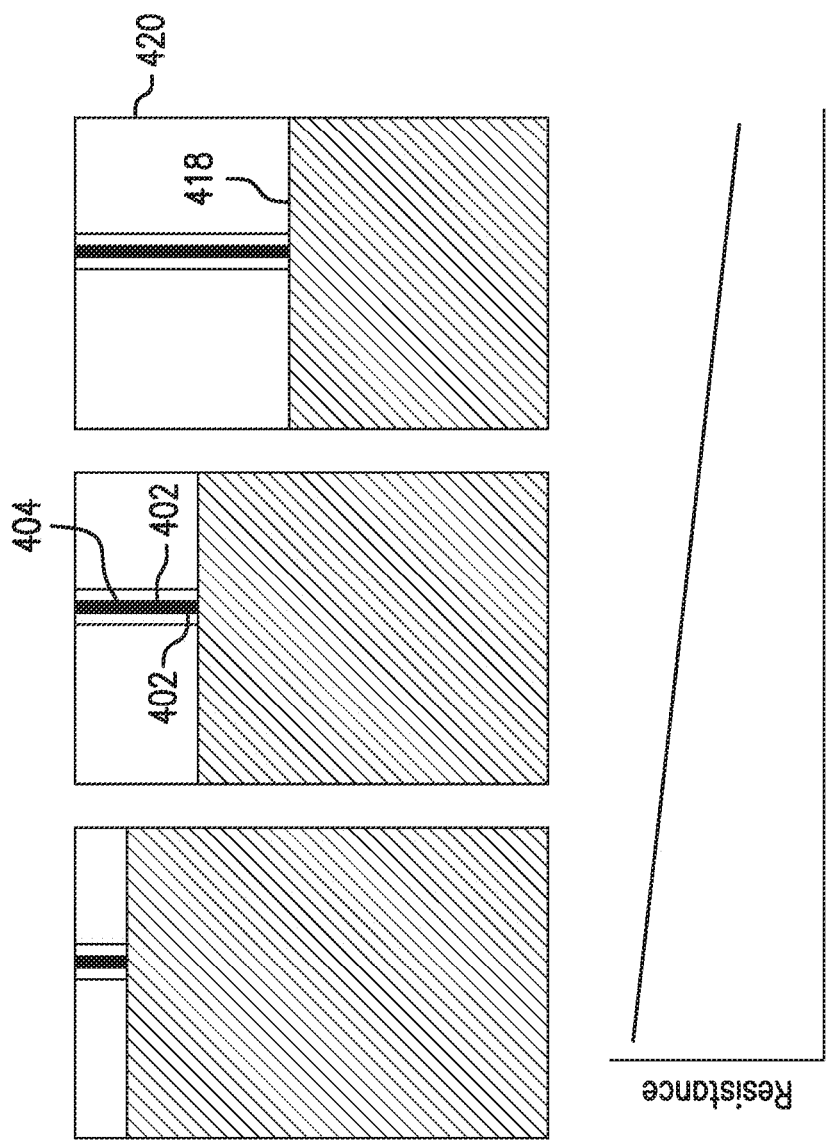

Additionally, and alternatively, FIG. 4A illustrates the use of a commoditized series of individual photo resistors 402, which also may be comprised of a photo resistive film 404, such as cadmium sulfide, provided between electrical contacts, wherein a series of such photo resistors 402 may be placed along a conductive strip 406 to provide similar functionality to the photo resistive printed label of FIG. 3B. FIGS. 4A and 4B illustrate, schematically, and graphically, variations in content level that may be sentenced based on the progressive exposure of photo resistors. Of note, the illustrated photo resistors may comprise a strip of individual photo resistors, as discussed with respect to FIG. 4A, or may comprise a printed trace photo resistive label, such as is discussed with respect to FIG. 4B.

Figure 4B:
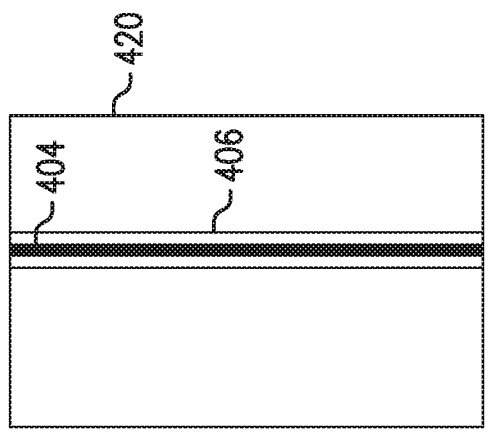

In the illustration of FIGS. 4, as the product content level 418 drops, more photo resistive sensors are exposed and the resistance of the circuit drops. This is also graphically illustrated in correspondence to the change in level sensing by the resistance graph shown in FIGS. 4A and 4B. In such embodiments, level sensing occurs at discrete levels correspondent to the presence of each individual photo resistor along the strip in FIG. 4A, or improved and substantially continuous resolution may be achieved by using the photo resistors strip of FIG. 4B.

More particularly, FIG. 4B illustrates, schematically and graphically, the level sentencing with the use of a photo resistive printed trace 404. As shown in the illustration of FIG. 4B, the photo resistive strip may be printed to cover the full height of the container/consumable 420. As the content level within the container 420 drops, the exposure locations along the strip increase and the resistance accordingly drops in a manner akin to that discussed above with respect to FIGS. 4A and 3B. However, in contrast to FIG. 4A, the embodiment of FIG. 4B provides continuous level sensing and a linear drop in resistance, as is illustrated graphically, in correspondence with the change in container levels. Moreover, the resistance of the overall circuit may be modified by changing the thickness of the ink layer and or the width of the print of the photo resistive strip 404. Thereby, the range and/or resolution of the photo resistive sensing circuit may be modified or calibrated for different contents that may reside within the container 420.

It will be appreciated that the foregoing embodiments may also work for liquids having a certain opacity, as well as for bulk solids sensing discussed throughout. That is, provided herein is an inexpensive method to continuously detect change in product level by sensing a change in resistance for solids or liquids.

It will be understood that the durable discussed throughout may be generic or proprietary. That is, a proprietary durable may be operable only with a particular brand of consumables, and hence other brands of the same type of consumable will not operate with the proprietary durable. Modification of the aspects discussed herein, such as customization in aspects of a printed photo resistive label, may make it difficult to genericize a proprietary durable. Thereby, a proprietary durable may enhance brand loyalty for certain categories of consumables.

Figure 5:
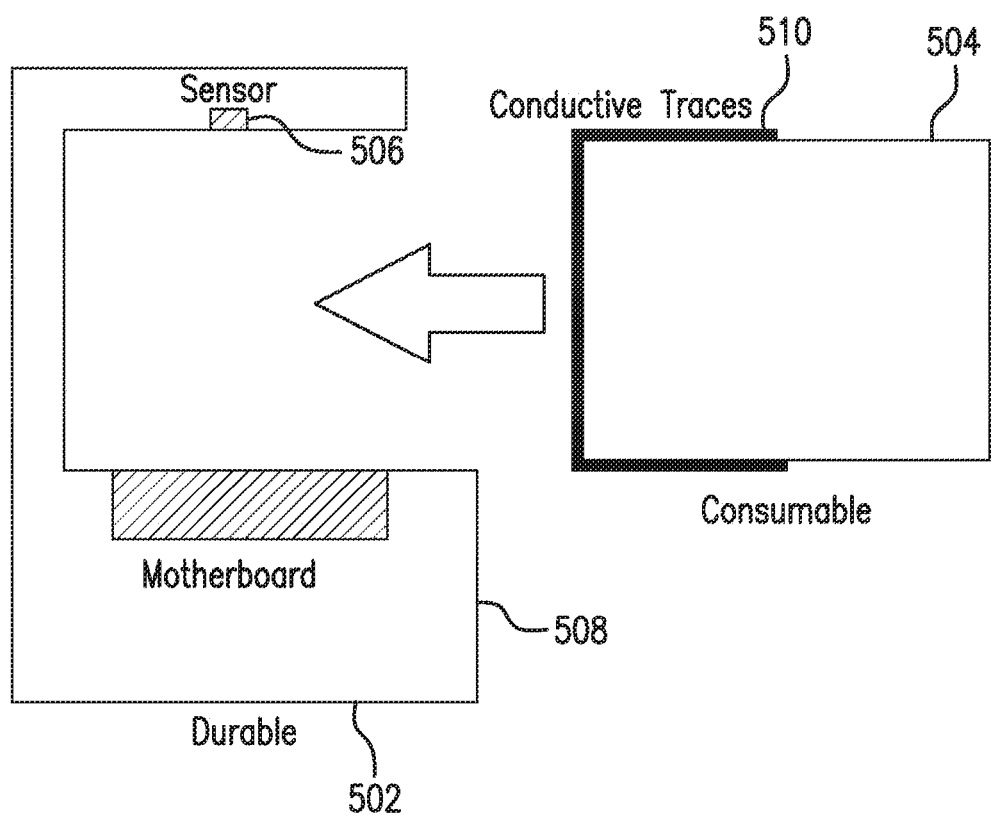
FIG. 5 illustrates aspects of the embodiments.

More particularly, FIG. 5 illustrates the association of a durable 502 and consumable 504, such as for a proprietary durable. As illustrated, both a sensing circuit 506 and motherboard 508 may be provided in the durable, but may not be connected to one another. The printed traces 510, such as photo resistive label traces, on the consumable 504 may connect the sensing circuit 506 and the motherboard 508 within the durable 502 only when the consumable 504 is placed within the durable. Thereafter, level sensing of the product within the consumable 504 may be performed as discussed throughout, such as based on the resistance of the consumable as sensed by the sensor and motherboard of the durable. As referenced above, the durable may thus be generic, or may include proprietary modifications, such as to the sensing circuit, the motherboard, the communication protocols between the sensing circuit on the motherboard, the type, size or makeup of the conductive traces, the printing label printing methods, and so on.

Figure 6A:
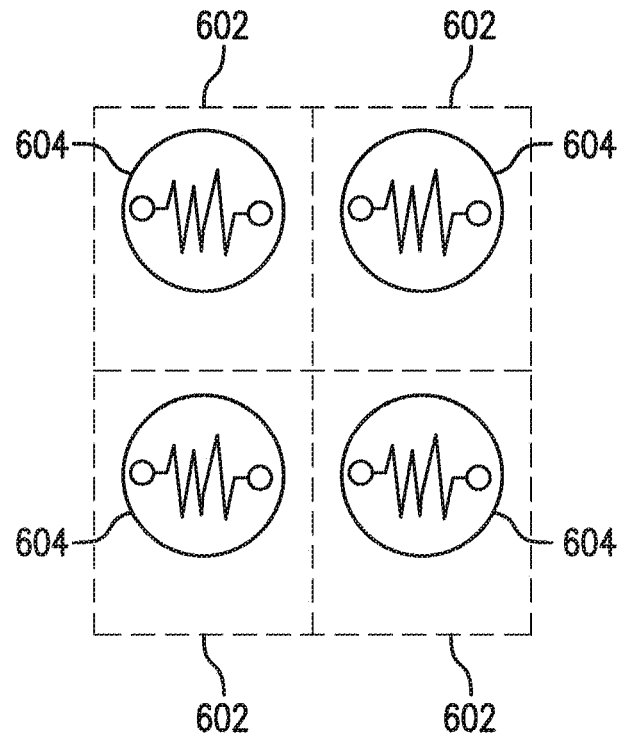
FIG. 6 illustrates aspects of the embodiments.
Figure 6B:
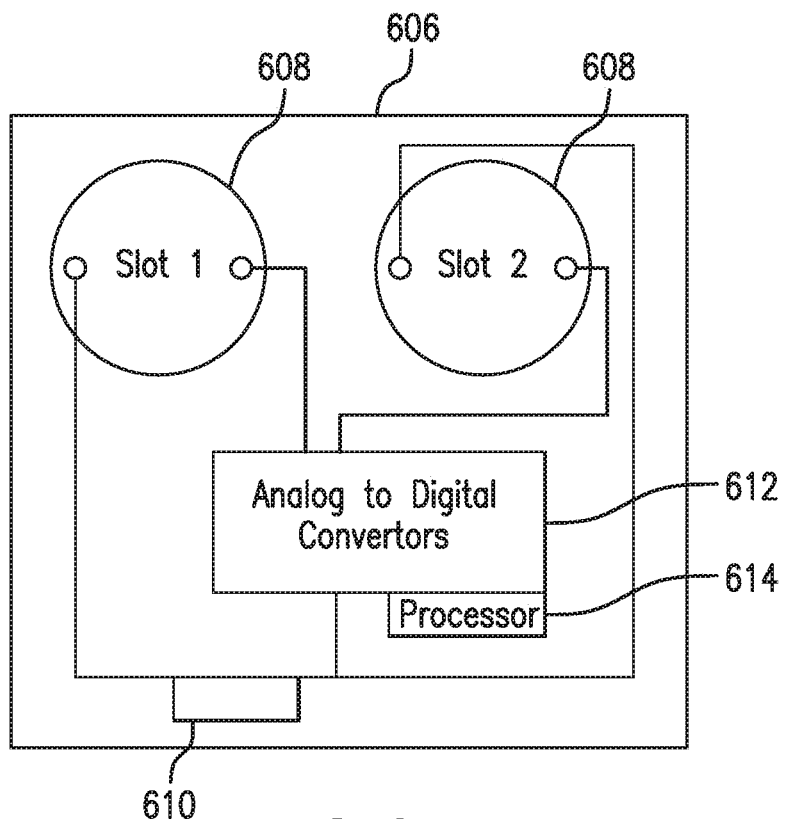

FIGS. 6A and 6B illustrate a resistance-based product identification that may be provided in accordance with the embodiments. Each consumable label 602 may be printed with a resistive trace 604, such as a polymer resistive material. The value of the resistive trace may be unique for each product identification, as shown.

The durable 606 may then have slots 608 connectively associated with power 610 and the input-output of one or more analog to digital convertors 612 associated with a microprocessor 614, such as to identify the different resistance values of the resistive trace 604 associated with a consumable placed within the slot 608. Thereby, if multiple consumable items may be used in a single durable, the resistive sensing identifies which consumable was used. If multiple consumables may be simultaneously placed within the durable at multiple slots at the same time, the disclosed embodiment may identify which consumable is in which slot. It will be appreciated that the variations in resistance of the resistive trace may be provided by any known methods, such as variations in the shape, length, thickness, or type, such as the polymer composition, of the trace used.

In relation to the proprietary or non-proprietary nature of the durables as discussed above, the aforementioned dashboard may be associated with one or more sellers or brands of the referenced solids. In such circumstances, an analytics dashboard may be available to the brand for user and use data indicative of certain geography use, global use, use at times of the day, use by demographic area, or the like. This and additional information provided at the dashboard may allow for a brand to target or otherwise send special offers, discount codes, or the like to particular users, such as high-volume users.

Dose size may be set up using the app or a web-based application, such as in small, medium, and large, increments, and those increments may be particularly associated, such as by a manufacturer's specifications. Alternatively, dosing may be hard coded into the firmware, such as for a given container size typically received by the base. Needless to say, dosing sizes may serve as portion control for solids that are eaten.

Moreover, the firmware, such as absent intercommunication with the cloud or in association with cloud communication, may indicate and/or otherwise trigger an autoreplenishment event. This auto replenishment may be automatic or semi-automatic—a semi-automatic autoreplenishment event may show a confirmation dialogue or other alert to the user, such as in the app, which may allow for the user to cancel or confirm the order; or, the auto replenishment order may be fully automated. An autoreplenishment event may be communicated to the referenced cloud backend, such as subject to an additional confirmation, such as by an app alert or an email, to the ordering consumer. Further, such an auto replenishment event may contribute to the data that may be provided to a brand, such as on the brand dashboard. Data associated with an autoreplenishment may include date, time, location, and/or user ID of the app associated with the auto replenishment, percent level for replenishment (which may be automatic as an autoreplenishment threshold, or which may be set by the user), product SKU, or the like.

Functionality for the cloud may include storage of level updates, dosage events, and auto replenishment events, by way of example. Further, cloud functionality may include user activity data, interactivity, reset capability, and the like. Decisions, such as the reaching of thresholds for discounts, may optionally occur in the cloud, and the brand dashboard may be enabled to approve such discounts to send, such as for receipt by the consumer app, discount codes and/or other targeted advertising to select consumers. Select consumers may be particular consumers meeting certain data thresholds, classes of consumers, app profile information, or the like.

Auto replenishment events available in the dashboard may be provided in list, mapped, or threshold formats, by way of non-limiting example. Accessing an auto replenishment event may open a particular consumer profile, and may make available to the dashboard all data associated with that profile. Such data, which may be in a map form as referenced above, may include latitude, longitude, location, distance from nearest seller of the brand, use date, use time, percent solids level, machine used with, and/or the like. Also included in the brand dashboard data may be typical frequency of use, recent frequency of use, time since last use, and so on.

In accordance with the foregoing, the user app may additionally include various aspects. For example, the smart phone at may be enabled to discover and pair with the firmware of the dispensing base, such as when the base is activated or on, as mentioned above. The smart phone app may display autoreplenishment requests or confirmation, such as in a user dialogue format. Further, the smart phone app may display a current solids level, and the frequency of updates for the solids level. Also indicated may be proper dosing for that solid and the ability for the user to request dosing.

The app may additionally include the capability to receive discounts and targeted advertising, such as from the brand dashboard. These may be in the form of a push notification or a user dialogue that provides an app alert to accept and/or apply the discount code, such as wherein the discount code may be saved for the next order or applied to a current order. Of course, the app may include the ability to change any one or more of the foregoing settings or any additional settings, such as autoreplenishment settings, such as wherein the level percentage threshold may be varied for an autoreplenishment indication. The foregoing may be available from a drop-down or similar menu, a pop-up window, or via any known user interaction, by way of example.

The dashboard referenced herein may additionally include particular aspects. For example, the dashboard may include autoreplenishment event data, particular user information, location-based information, and the like. Further, the dashboard may integrate third-party data, such as weather data, to allow for data fusion between sensed data and publicly available data sources, such as in order to optimize sales.

The dashboard may also include one or more search capabilities. That is, a dashboard user may search for particular data across one or more users, such as "frequent users", "fading users" (i.e., a list of users whose frequency of use has fallen relative to long-term usage), certain geographic searches, usage associated with certain events (such as snowstorms), and the like. Responsive to the search, and otherwise available from within the dashboard, may be a consumer data display. That is, dashboard events, such as autoreplenishment events, may include drill down capabilities to obtain more detail on particular consumers. The drill down may include basic information, such as delivery address or locale, and more particular information, such as dosing events or solids levels over time.

The dashboard requirements may additionally include an ability to design marketing campaigns and/or discount codes. For example, discount codes may be provided based on the meeting of certain thresholds by certain data of consumers. Thereby, the discount codes may be automatically generated upon the trigger event for one or more consumers, or may be "hard entered" by a person controlling the dashboard. Moreover, the foregoing aspects may overlap, such as wherein discount codes are readily executed, such as responsive to a single click, to all consumers that have been returned responsive to an entered search within the dashboard.

Additional functional requirements may include those of the cloud based backend. The cloud based backend may store data, including autoreplenishment events, dosing events, and solids level events, by way of example, and may be suitable to serve that data back to the smart phone app and/or to the dashboard as needed. Further, certain of the decision-making algorithms discussed herein throughout may also reside at the cloud based backend, such as rather than residing in a smart phone app or in association with the dashboard.

Figure 7:
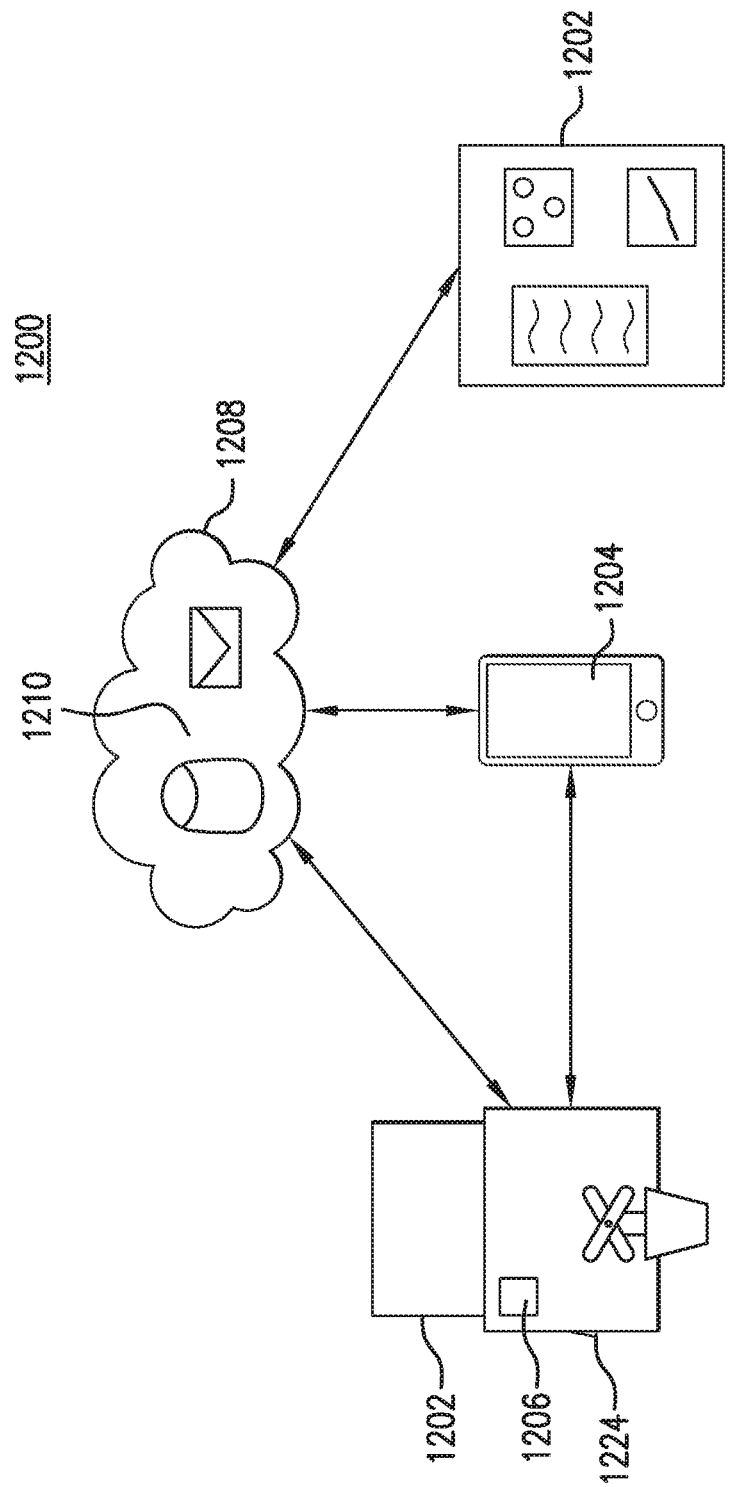
FIG. 7 illustrates an exemplary cloud-based solids sensing system.

FIG. 7 illustrates a system 1200 in which the dashboard 1202 and/or smartphone app 1204 housing the code to implement the method(s) discussed herein throughout may be included. As shown, a container 1200 having associated there with sensors 1206 is inserted into a smart dispensing base 1224. The illustrated dispensing base is then suitable to communicate with a smartphone app to exchange the information discussed throughout. The smartphone app may then communicate with the cloud 1208, although it should be noted that the smart dispenser may additionally or alternatively communicate directly with the cloud 1208, such as via a Wi-Fi network. The cloud based backend 1210 may then communicate with the smartphone app 1204 and with the brand dashboard 1202, as discussed herein throughout.

In the foregoing Detailed Description, it can be seen that various features are grouped together in a single embodiment for the purpose of streamlining the disclosure. This method of disclosure is not to be interpreted as reflecting an intention that the embodiments require more features than are expressly recited herein.

The invention claimed is:

1. A consumable level monitoring system for association with a food content-filled consumable, comprising:
    a sensing module having aspects thereof both on a label associated with the content-filled consumable and a durable dispensing base suitable to receive the content-filled consumable, comprising photo resistive and conductive traces for continuous level sensing of the content within the content-filled consumable; and
    a visual indicator suitable to receive the consumable level from the sensing module, and for communicating the consumable level to a user.

2. The system of claim 1, wherein the visual indicator is a color changing indicator.

3. The system of claim 1, wherein the sensing module is passive.

4. The system of claim 1, wherein the sensing module is active.

5. The system of claim 1, wherein the sensing module is on an outside aspect of the label.

6. The system of claim 5, wherein the label further comprises an electronic communication module.

7. The system of claim 6, wherein the communication module comprises a processor.

8. The system of claim 1, wherein the label is networked.

9. The system of claim 1, wherein the dispensing base includes a dispenser in physical communication with the content and capable of dispensing the content from the consumable to modify the content level.

10. The system of claim 9, wherein the dispenser base comprises one of a crank, a spout, or a spigot.

11. The system of claim 1, further comprising a power module for powering at least the sensing module.

12. The system of claim 1, wherein the communication to the user comprises a display over at least one network.

* * * * *